United States Patent [19]

Shore

[11] 3,831,721

[45] *Aug. 27, 1974

[54] DUMP VALVE AND FORWARD-REVERSE DRIVE CONTROL EMPLOYING SAME

[75] Inventor: Daniel B. Shore, Niles, Ill.

[73] Assignee: International Harvester Company, Chicago, Ill.

[ * ] Notice: The portion of the term of this patent subsequent to July 29, 1986, has been disclaimed.

[22] Filed: Jan. 23, 1969

[21] Appl. No.: 818,857

Related U.S. Application Data

[63] Continuation of Ser. No. 689,549, Dec. 11, 1967, Pat. No. 3,458,018.

[52] U.S. Cl. .................................... 192/4 C
[51] Int. Cl. .................................... B60k 29/02
[58] Field of Search .............. 192/4 A, 4 R, 4 C

[56] References Cited
UNITED STATES PATENTS

| | | | |
|---|---|---|---|
| 2,961,078 | 11/1960 | Shannon et al. | 192/4 R |
| 3,348,644 | 10/1967 | Hilpert | 192/4 R |
| 3,381,770 | 5/1968 | Fauchere | 192/4 R X |
| 3,437,184 | 4/1969 | Wilson | 192/4 R |
| 3,458,018 | 7/1969 | Shore | 192/4 R |

*Primary Examiner*—Benjamin W. Wyche
*Attorney, Agent, or Firm*—John W. Gaines; Floyd B. Harman

[57] ABSTRACT

Tractor having dump valve and forward-reverse drive control employing same, effective to automatically brake the tractor when the tractor's direction of motion is to be reversed. The tractor has brakes and a reversible transmission controlled by the dump valve, a run detector pump to sense direction of rolling movement of the tractor and having a directionalized pump output, and a range selector valve having a control portion. By suitable interaction with the other components, the dump valve receives against pressure movable end areas thereof an output from the range selector valve and directs control pressure to operate the brakes and transmission in alternation to one another. More specifically, the dump valve: receives against the pressure movable end areas the directionalized pump output so as to be hydraulically balanced in a centered position operating the tractor with transmission engaged and brakes disengaged; receives against the pressure movable end areas an unbalancing force from the range selector valve control portion (due to reversal of the range valve position) causing the dump valve to shift off center and dump, neutralizing the transmission and setting the brakes; and having valve springs effective to mechanically rebalance the dump valve attendant with slow down of the run detector pump, causing the dump valve to recenter, releasing the brakes and engaging the transmission in an opposite drive setting.

1 Claim, 4 Drawing Figures

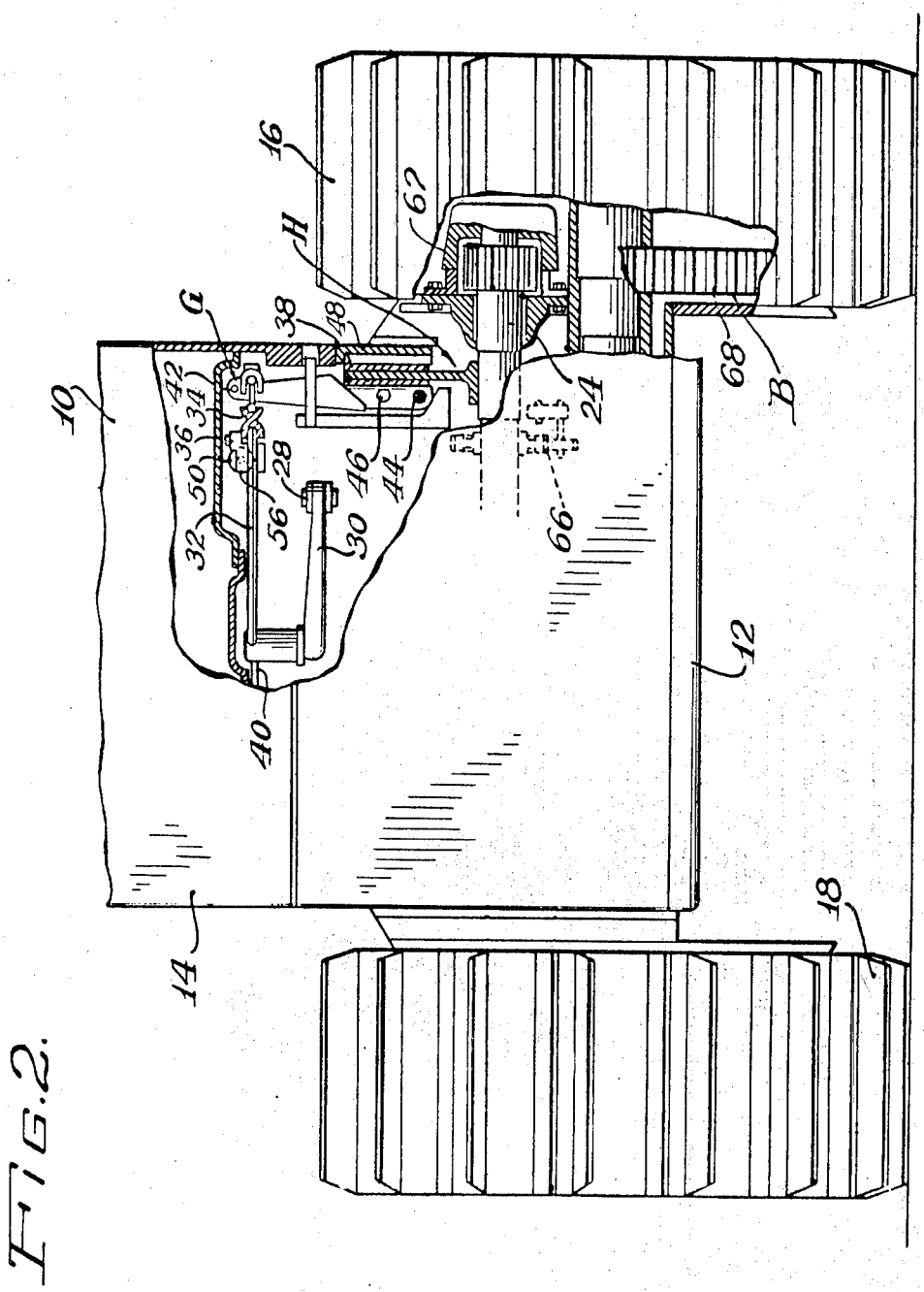

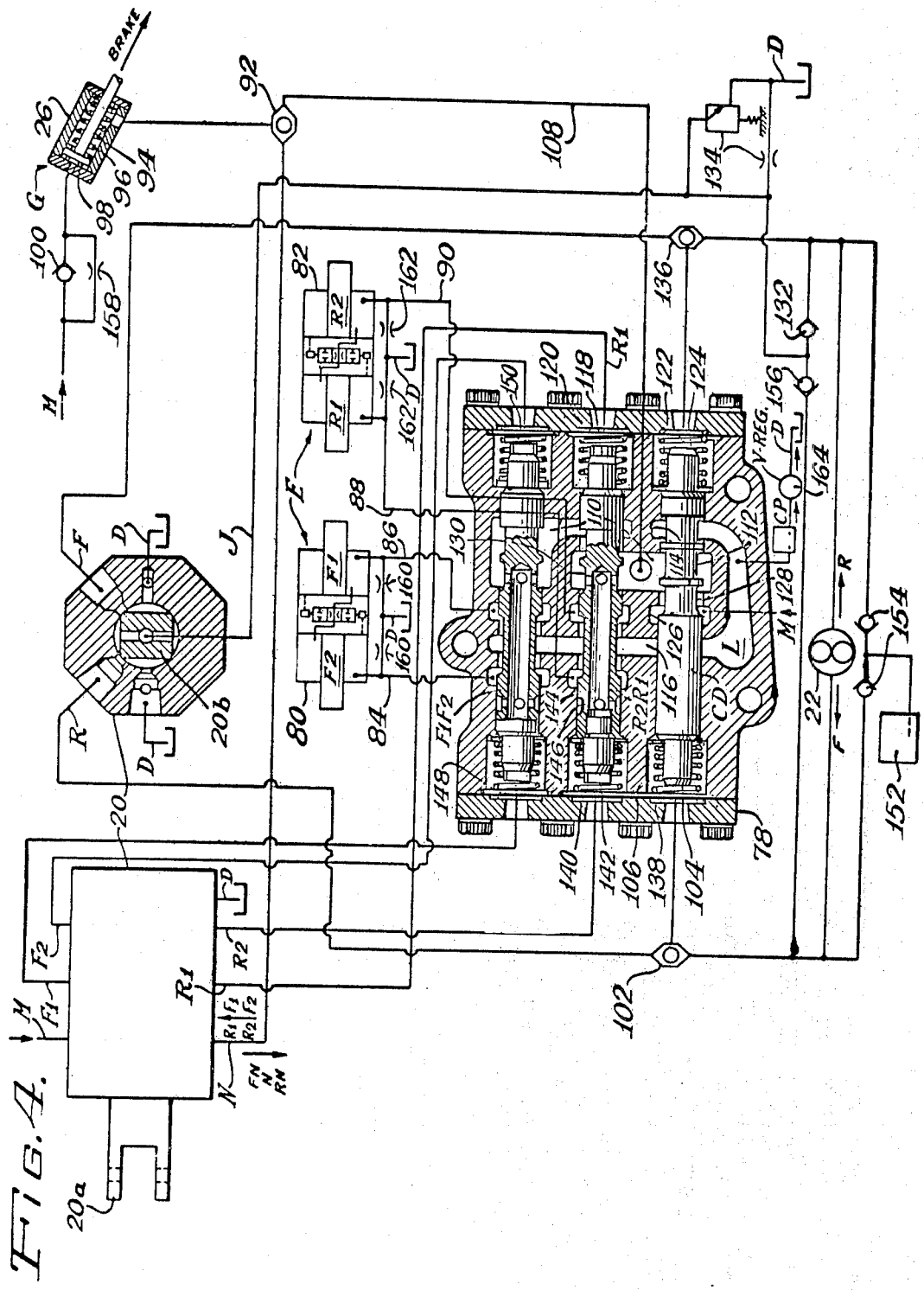

DUMP VALVE AND FORWARD-REVERSE DRIVE CONTROL EMPLOYING SAME

This application is a continuation of and copending with my U.S. Pat. No. 3,458,018.

This invention relates to a vehicle provided with conventional brakes, and to an interacting vehicle transmission provided therein which is operated by a forward-and-rear drive control which is provided so that, when being reversed, the transmission at once neutralizes while the brakes are progressively being applied automatically, and subsequently the transmission goes into the opposite or reverse drive setting as and when the brakes have brought the still rolling vehicle to the point at or near standstill, at which point the brakes release automatically without delay.

In the foregoing manner, my invention provides for conditioning of the operating mechanisms in the vehicle so that as each reverse shift is being completed, the take-over shock encountered by the reverse power path through the transmission is materially reduced or substantially eliminated. While the invention is primarily applicable to loaders and industrial construction and agricultural tractors, it has equal application to trucks and other vehicles equipped with a transmission drive, particularly a power shift transmission.

By reverse as used in a less encompassing sense, is meant only that condition of the transmission for driving to the rear whereas reverse, as used in the encompassing sense of a reverse shift above, means a change either from rear drive to drive in the forward direction, or vice versa. Similarly, reversing the power path is an expression meaning changing from rear drive to forward drive, or vice versa.

Shuttle work to-and-fro constitutes such a major part of the utility of industrial construction, agricultural, loader, and like vehicles, that a suitable power shift transmission or hydrostatic transmission is desirable to expedite the speed changes and direction changes that are a frequent necessity to the operator. Problems arise when shuttling many such vehicles because reverse shifting is tedious and time consuming, and very often puts the transmission under undue strain due to shock loading of the reverse power path in effecting the change of direction.

My invention alleviates the foregoing problems. It especially alleviates the situation arising first in the forced reverse shift situation encountered with a power shift transmission and second arising in such a short interval, and without conditioning the operating components of the vehicle, that the strain is excessive, as will now be explained. Features, objects, and advantages will either be specifically pointed out or become apparent when, for a better understanding of the invention, reference is made to the following description taken in conjunction with the accompanying drawings, which show a preferred embodiment thereof and in which:

FIGS. 1 and 2 are right side and rear end elevational views to small scale and large scale, respectively, of a tractor embodying the present invention;

FIG. 4 is an hydraulic circuit, illustrated with single lines, of the tractor control system.

Figure 1:
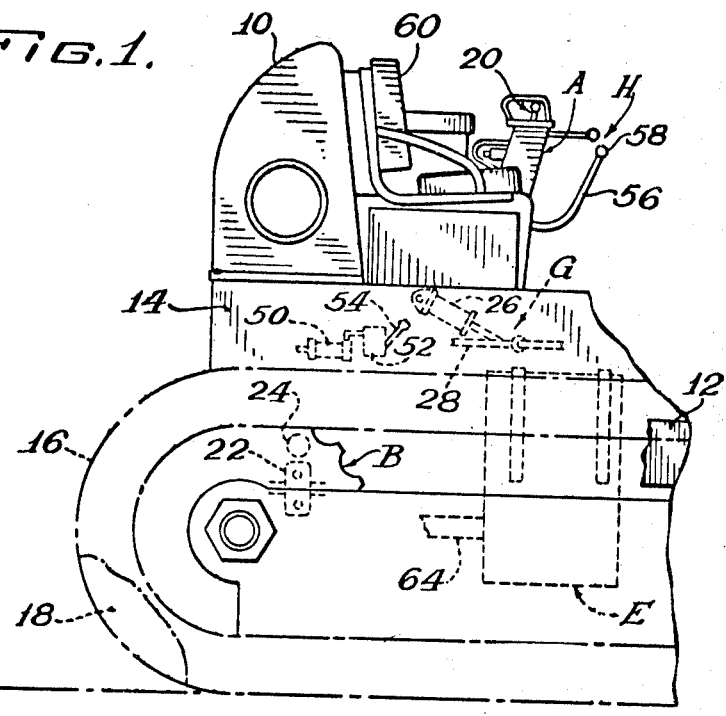
Figure 3:
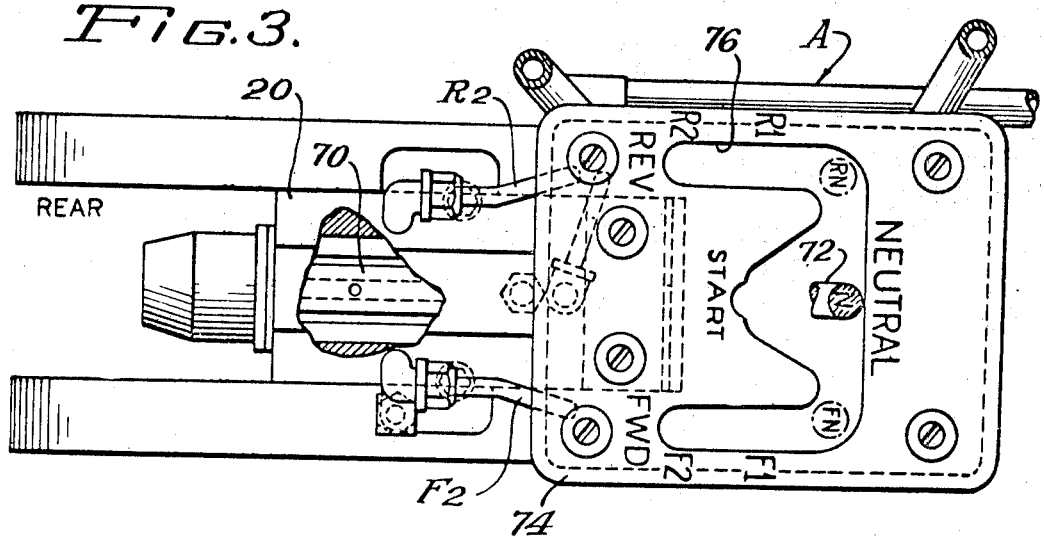
FIG. 3 is a top plan view of a detail of FIG. 1.

More particularly in FIG. 1 of the drawings, the rear portion of the illustrative vehicle 10 which is shown is part of a crawler tractor for use in moving, loading, or carrying earth or other material. A longitudinally extending tractor frame 12 carries a body 14 of the vehicle and is carried by left and right longitudinal endless tracks 16 and 18 disposed one on each lateral side of the frame 12. The vehicle 10 proceeds in a straight line so long as the tracks 16 and 18 are driven at the same speed and the vehicle is steered when the speed of the respective tracks differs.

The interacting components providing the essential control parameters according to my invention comprise first, a range selector valve 20 forming part of a transmission range selector control tower A and second, a run detector comprising a transmission signal pump 22 which is connected to the sprocket drive pinion shaft 24 forming part of a sprocket final drive system B. By means of directional pressure control signals which they supply in a manner hereinafter described, the two components 20 and 22 interact in a varying manner to control a neutralizable transmission system E which drives the vehicle and an automatic power brake cylinder 26 which is connected to a brake linkage 28 forming part of the vehicle braking system G.

By the term neutralizable transmission system E, what I mean broadly is any hydrostatic, hydromechanical, or mechanical drive, or a power-shift, friction drive such as includes at least one opposite brake or clutch which remains inactive to reverse the drive until a companion operative brake or clutch has definitely been declutched, all having an effectively de-coupled condition of receiving input and yet transmitting no power output.

BRAKES: MECHANICAL CONNECTIONS--FIGS. 1 AND 2

The brake pedal linkage 28 is actuated by being either drawn forwardly by a brake pedal, not shown, or pushed forwardly by the automatic power brake cylinder 26 to set the brakes of the vehicle braking system G. At the rear, the brake pedal linkage 28 is connected to a brake applying arm 30 which is pulled forwardly when the linkage is actuated. The arm 30 operates in a mechanical path by means of an outwardly moving, push-rod connection 32 and a longitudinal arm 34 of a pivot brake bellcrank 36 to apply a caliper brake against a brake disk 38 in the right sprocket final drive system B to the track 16. Similarly, the arm 30 operates by means of another outwardly moving, push-rod 40 to apply a caliper brake against a brake disk, not shown, connected in the left sprocket final drive system to the track 18. The linkages on both sides are the same, and operate the two caliper brakes simultaneously.

More specifically, the push-rod 32 and bellcrank arm 34 connection pushes outwardly against the upper end 42 of a caliper lever which is pivoted at its lower end on a fixed pivot 44. A shoe, not shown, which is carried by a pivot 46 on the caliper lever is forced against the adjacent brake disk 38 and the reaction is taken by the main case 48 of the final drive.

BRAKES: HYDRAULIC CONNECTIONS--FIGS. 1 AND 2

The brake pedal linkage 28 receives hydraulic assistance from two, transversely aligned pivot cylinders 50, the likage 28 controlling the cylinders through valves 52 in communication with the respective cylinders and carrying the respective valve operating levers or arms 54. The linkage 28 has a single connection to the two arms 54 jointly so as to operate the cylinders 50 in unison.

As illustrated in FIG. 2, each pivot cylinder bellcrank 36 has a lateral arm 56 in engagement with a pivot cylinder 50. The arms pivot the bellcranks 36 when two cylinders 50 extend, causing engagement of the vehicle braking system G at both sides of the vehicle.

STEERING DRIVE SYSTEM--FIGS. 1 AND 2

Each of the pivot cylinders 50 is part of a series of three hydraulic boosters, each series being disposed at one side of the vehicle for controlling the sprocket drive pinion shaft 24 at that side to steer the vehicle. The valving for the boosters is included among the valves 52, and the arms 54 operate all such valves.

A steering drive system H includes right and left steering levers 56 and 58 which are slightly forward of the operator's seat 60 and which are operated by hand so as to swing fore-and-aft in vertical planes. Each steering lever has a separate connection, not shown, to an arm 54 for operating the steering valving independently. The steering system H also includes each of the brake disks 38 (FIG. 2).

FINAL DRIVE B--FIG. 2

Each of the sprocket drive pinion shafts 24 has one of the brake disks 38 fast thereto, and also a pinion 62 fast thereto. The two pinion shafts 24 are jointly driven by a reversible pinion shaft 64 which the power shift transmission system E drives, and one of the pinion shafts 24 drives the run detector pump 22 by means of intervening gearing 66.

The pinion 62 on each shaft 24 meshes with a bull gear 68 in the final drive B at each side of the vehicle. Depending upon the gear reduction desired, each bull gear 68 can directly drive the drive sprocket of the adjacent track or can be connected to the sprocket by reduction planetary gearing, not shown.

RANGE SELECTOR VALVE--FIG. 3

The body of the range selector valve 20 carries a range spool 70 mounted for rotation and reciprocation therein. A selector lever 72 has a pivot connection at its midportion to the forward end of the range spool 70 and causes the spool 70 to be set in appropriate positions as the lever 72 is moved by the operator among a neutral position indicated at N in solid lines, a forward neutral position indicated at FN in broken lines, a reverse neutral position indicated at RN in broken lines, and respective drive positions F1, F2, R1, and R2 which are opposite similar markings on a slotted gate plate 74 mounted atop the transmission range selector control tower A. The slot 76 in the plate 74 receives and guides the lever 72 and is of a general U-shape.

The body of the range selector valve 20 has, in addition to the drain lines indicated at D hereinafter, a set of oil lines connected thereto including lines F2 and R2 as shown, and N, FN, RN, F1, and R1, not shown, the abbreviations being functional drive designations including neutral (N).

CONTROL CIRCUIT--FIG. 4

Regulator valving, not shown, provides main, lube or intermediate, and drain pressure at the respective points abbreviated by their functional designations M, L, and D, previously referred to. For simplification, all points and lines designated D can be maintained at the lube pressure L if desired.

The body of the range selector valve 20 is drawn so that it appears at two points in FIG. 4, the range spool according to this manner of illustration being split out and shown in both a longitudinal view 20a and a transverse sectional view 20b for ease in understanding. The range selector valve 20 is connected via a set of transmission valves 78 with directional clutch packs in the transmission system E, specifically a forward speed pack 80 and a reverse speed pack 82. The already enumerated set of oil lines interconnects the selector valve 20 and the transmission valves 78, and four service lines 84, 86, 88, and 90 interconnect inlet-outlet ports in the respective transmission valves 78 and the clutch packs 80 and 82 to provide forward and reverse speed settings in the transmission. Two shafts designated F1 and R1 extend to extablish the low speed forward and reverse drives in the transmission system E, and two shafts designated F2 and R2 extend to establish high speed forward and reverse drives, respectively. The clutch packs are conventional, neutralizing the existing drive setting without delay and progressively engaging a drive as selected.

In brief, the range selector valve 20, which is a multi-position valve, and the run detector pump 22, which is a reversible pump, mutually operate a comparator-dump valve spool CD among the transmission valves 78 to coordinate neutralization of the clutch packs 80 and 82 and transmission, and application of the automatic power brake cylinder 26. In addition to having such coordinated action of neutralization and brake application, the transmission system E and vehicle braking system G also have independent operation for the usual purposes.

INDEPENDENT TRANSMISSION NEUTRALIZATION--FIG. 4

In the neutral setting of the range selector valve 20 wherein the range spool has the position 20a as shown in its longitudinal view and the position 20b as shown in its transverse sectional view, all in solid lines, the four oil lines F1, F2, R1, and R2 are connected in common to, and are at the pressure of, the drain line D.

The neutral line N on the valve 20 and the main pressure line M on the valve are interconnected thereby, and a double check valve 92 leading to the power brake cylinder 26 unseats in a rightward direction such that the oil line N communicates, and sustains main line pressure in, the rod end of the power brake cylinder 26. The force of the pressure in a rod-end chamber 94, coupled with the force of a brake release spring 96 in the chamber, overcomes the force of main line pressure M constantly maintained in the head end chamber 98 of the cylinder 26. Any fluid trapped in the head end is thereby forced through a check valve 100 which unseats to allow the fluid to enter therethrough into the main line M. The brake cylinder 26 is held in the foreshortened, brake release position.

Irrespective of whether the run detector pump 22 is stopped or being operated due to coasting of the vehicle in one direction or the other, there is no further pressure in an active circuit in the hydraulic control and in such condition the transmission system E remains in neutral and the brake system G remains disengaged.

A similar condition obtains with the vehicle either stationary or coasting, when the lever is moved into one of its additional transmission neutral positions RN or FN.

When the vehicle is coasting in either direction, e.g., forwardly, and the range spool is rotated clockwise from the position shown in solid lines 20b so as to take a position to the right corresponding to that same forward direction of the vehicle, no further pressure occurs in an active circuit in the hydraulic control. Coasting of the vehicle in that direction, e.g., forward, when the range spool is rotated leftwardly from the position shown in the solid lines 20b into the counterclockwise position, causes fluid to flow indirectly from the F side of the run detector pump 22, through a line J, the valve 20b, a line R, and thence from one direction into a double check valve 102 in the line R and against a pressure movable end area 104 carried by the comparator-dump valve CD and physically located in a pressure operating chamber 106 at that end. The run detector pump also directly applies pressure from a different direction into the double check valve 102 and against the same pressure movable area 104 carried by the comparator-dump valve CD. An opposite pressure movable end area 124 on the valve spool CD is meantime connected by a double check valve 136 to the drain side of valve 20 and to the suction side of the pump 22. The spool CD perforce shifts to the right as viewed in FIG. 4, causing only the right side of the double check valve 92 to be relieved of pressure in a path from the valve 92, through an oil line 108, a gallery-shaped common transfer chamber 110 in the set of transmission valves 78, a spool undercut 112, and thence through a cored cavity 114 into a gallery shaped common lube pressure chamber 116.

So while the transmission has not changed setting, the set of valves 78 has been pre-conditioned for a change due to shift of the spool CD, and the double check valve 92 has been pre-conditioned to change the brake condition because only one side thereof (connected to oil line N) remains pressurized.

NEUTRALIZATION WITH AUTOMATIC BRAKING--FIG. 4

This situation is made to occur when the preconditioning just described exists, i.e., the vehicle is coasting in one direction, e.g., forward, when the range spool has reached the transition position (RN) corresponding to the opposite vehicle direction. From the latter position, the spool from the position corresponding to the longitudinal view 20a is shifted rightwardly, as seen in that view, into the R1 position also known as low reverse. The only pressurized oil line N connected to the double check valve 92 is vented to drain D through the range selector valve 20, relieving pressure in the rod end chamber 94 of the automatic power brake cylinder 26.

The brake system G is applied because the hydraulically unopposed main pressure in the head end chamber 98 extends the cylinder 26 and, at the same time, the oil line R1 applies main line pressure to a pressure movable right end area 118 carried by the valve R2R1 and located in a pressure operating chamber 120. The valve R2R1 moves leftwardly as viewed in FIG. 4, forming a drain path in which the fluid can flow from the right side of the clutch pack 82, through the line 90, and thence through an undercut 130 to transfer chamber 110 which is maintained at the lube pressure level.

Hence, transmission system E remains in neutral during the deceleration period while the rolling vehicle is being braked by the braking system G.

At some point during the terminal portion of deceleration of the vehicle, speed of the run detector pump 22 decreases until the pump output pressure in the valve end chamber 106 is overcome by the force of a spring 122 surrounding the pressure movable end area 124 presented by the comparator dump valve spool CD in a pressure chamber receiving the right end of the spool CD. The spool CD mechanically recenters, between the spring 122 and an opposite spring 138 balanced thereby, to its neutral or satisfied position, blocking the cored cavity 114 which is at lube oil pressure and communicating main line pressure to the right end chamber of the reverse clutch pack 82 through a path leading from a cored cavity 126 in the transmission valving 78 which is at main line pressure, through an undercut 128 in the spool CD, the transfer chamber 110, and an undercut 130 in the leftwardly shifted transmission valve spool R2R1, thence through the service line 90 into the directional clutch pack 82 to establish the R1 drive setting. The clutch packs are of well known commercial construction, providing a quick, low pressure slack take up prior to application of full clutch engaging pressure, to minimize shock of engagement.

Simultaneously, the centered valve spool CD causes main line pressure to be applied to the automatic power brake cylinder 26 in a path leading from the cored cavity 126, through the undercut 128, the transfer chamber 110, and the oil line 108, thence through the right side of the double check valve 92 and into the rod end chamber 94 of the cylinder 26 to retract same and release the brake system G.

The vehicle then accelerates to the low speed in the desired opposite direction, i.e., R, and perforce the run detector pump 22 reverses direction so that oil flows therefrom in the direction of arrow R in a path leading through a check valve 132, a valve and restriction type, maximum pressure regulating circuit 134, the oil line J, the range spool 20b which occupies a leftward position from the position 20b shown in the solid line sectional view, and the oil line R, thence through the upper half of the double check valve 102 and into the pressure chamber 106.

Simultaneously, oil flows in the direction arrow R from the run detector pump 22 through the bottom half of a double check valve 136 to pressurize the pressure movable end area 124 on the valve spool CD.

As a result, the comparator-dump spool CD is hydraulically balanced and also mechanically balanced by the previously described action of the springs 122 and 138, each engaging one end of the spool opposite from the other. This hydraulic and mechanical balance of the spool CD in its satisfied position continues as the reverse speed of the vehicle increases, and will continue to be maintained if the selector valve is advanced into the high speed reverse (R2) position for the purpose of shifting the transmission into high speed reverse drive.

CONVENTIONAL DRIVE CHANGES--FIG. 4

When proceeding rearwardly, the transmission system E is readily shifted for the last mentioned purpose between R1 and R2 positions by reciprocatory movement of the range selector valve 20. The R1 condition has been described, and the R2 condition is attended by main line pressure M being applied by the selector valve 20 through the oil line R2 into a pressure chamber 140. A pressure movable left end area 142 on the spool R2R1 is depressed under pressure, shifting the spool R2R1 to the right from the solid line position as viewed in FIG. 4. Main line pressure is thereupon directed by the valve R2R1 in a path leading from the cored cavity 126, through the undercut 128, the transfer chamber 110, and a longitudinal central passage 144 in the spool R2R1 which is cannelured, a set of radial passages 146, valving 78, thence through the service line 88 into the left chamber of the directional clutch pack 82 so as to cause high speed reverse drive in the transmission system E.

Changes in the forward drive range occur in conventional manner as result of changing the range selector valve 20 between the F1 or F2 positions, thereby applying main line pressure in a pressure chamber 148 or 150 so as to shift the forward valve F1F2 respectively to the right or to the left as viewed in FIG. 4. Main line pressure thus enters through the service line 84 into the left chamber or through the service line 86 into the right chamber of the directional clutch pack 80, the other service line and chamber being connected at the same time to the common lube pressure chamber 116 in the housing of the valves 78.

In either of its directions of rotation, the run detector pump 22 always draws from one oil reservoir 152. One of a pair of seat-to-seat connected check valves 154 unseats to connect the reservoir 152 to the suction side of the pump 22, whereas the other one of the check valves seats to block communication and stop escape of the pumped fluid from the output side of pump 22 back to the reservoir 152.

The check valve 132 unseats in the direction of a symmetrically disposed, alternately operable check valve 156, which valves are connected to the output side of the pump 22. When either valve is unseated to allow pump output fluid to flow into the regulator circuit 134, the other valve stays seated to prevent loss of the regulated pressure back to the suction side of the pump 22.

The regulator circuit 134 provides a continual restricted bleed to drain D from the oil line J and, in addition, prevents the pressure from exceeding a predetermined value irrespective of the speed of the run detector pump 22. At the lower pump speeds, the output falls below a predetermined reduced value, such that spring pressure of either spring 138 or 122 readily overcomes the back pressure created by the circuit 134 and recenters the spool CD.

A restriction 158 which is connected between main line pressure M and the head end chamber 98 of the power brake cylinder 26 insures freedom from abruptness with a gradual application of the brake system G to prevent shock. The restriction 158 is complemented by the check valve 100 hydraulically in parallel therewith, so that the two form a flow-check valve combination. On the other hand, the check valve 100 unseats and bypasses the restriction 158 during the reverse flow causing brake release, so that the brake system G can disengage immediately to expedite vehicle direction changes.

The forward clutch pack 80 has individual restrictions 160 symmetrically connected to the opposite actuating chambers therein so as to provide for a residual oil pressure for lubrication purposes in the chambers at all times. Similarly, the reverse clutch pack 82 has analogously symmetrically connected restrictions 162 for lubrication purposes, such restrictions all discharging to drain D.

The complete schematic circuit of the present hydraulic control, except for certain novel additions hereof, appears in the same assignee's copending Ruhl U.S. Pat. No. 3,386,523, the disclosure of which is incorporated in entirety herein by reference.

SUMMARY

In summary, novelty is felt to reside in the beneficial results created by the comparator dump valve CD. To illustrate the salient points, let us say that the vehicle 10 is rolling rearwardly. The valve spool CD has three phases of operation while the vehicle is so rolling. In the solid line position shown in FIG. 4, the valve CD in a first phase directs high pressure fluid from the chambers 126 and 110 to the brake cylinder 26 to sustain the cylinder in the foreshortened, brake release position; the valve CD also directs fluid from the chamber 110 through the appropriate transmission valve and into the active end of the selected one 82 of the directional clutch packs to keep the transmission engaged and sustain rolling of the vehicle rearwardly and under power.

In a second phase, the valve CD has an unbalanced position displaced to the right or to the left from the solid line position shown in FIG. 4, actually to the left under the assumed rearward rolling condition. Such position of the valve CD is attendant with movement of the valve 20 through neutral to a selected forward driving position, whereupon the valve CD dumps the pressure of transfer chamber 110 through the low pressure chamber 114 doing two things. The brakes progressively engage due to the valve CD dumping pressure from the rod end of the brake cylinder 26 which takes its extended, brake-apply position; and the driving clutch pack 82 releases the rearwardly driving clutch therein because the clutch cylinder activating pressure is dumped through the service line 88 or 90 leading to the transfer chamber 110 which is likewise being dumped by the valve CD. The brakes force the coasting vehicle to decelerate.

In the third phase, the valve CD recenters into the balanced position shown in solid lines in FIG. 4, restoring high pressure to the transfer chamber 110. Consequently the brake cylinder 26 goes into the foreshortened brake release position as attained in the first phase above, but a selected clutch in the forward clutch pack 80 is activated under the high, engaging pressure to engage the transmission in forward drive and change the vehicle from the former rearwardly rolling direction to the forwardly rolling direction desired.

The first phase of operation of the valve spool CD as just described results when the valve is hydraulically in balance from equal and opposite pressure forces on the pressure movable areas 104 and 124 at opposite ends of the valve CD. The run detector pump 22 applies regulated output pressure as a directionalized control signal to the end area 124 through a direct path including the double check valve 136. The same regulated pump pressure is applied as a directionalized control signal to the opposite area 104 through an indirect path leading through the check valve 132, the line J connected to the valve 20, and the valve 20b which occupies a leftward tilted position from the vertical position as shown in FIG. 4 in solid lines, and thence through the line R, and the double check valve 102 to the pressure movable area 104.

The second phase of operation of the valve CD when it is shifted leftwardly from the position shown in solid lines in FIG. 4, occurs because the prior pressure against area 104 is diverted when the high pressure control signal by the valve output is transferred to the line F, in attendance with the fact that the pressure movable area 104 is thereupon relegated by the double check valve 102 to the low pressure or suction side of the pump 22 and to the low pressure control signal or drain side of the valve 20. In other words, and having opposite directional senses (F vs. R) to one another, the R positive pressure signal output is still sustained from the transmission signal pump 22, while an F positive pressure signal output develops from the rightwardly tilted range selector valve 20b. The two outputs of opposite sense are connected to the common valve 136, which is in turn connected to the adjacent end of the valve spool CD.

For its third phase of operation in which the valve spool element CD is recentered to its solid line position as shown in FIG. 4, the pressure area 124 is relegated by the double check valve 136 to a predetermined reduced pressure of the output side of the pump 22 and to a predetermined reduced pressure of the side of the valve 20 supplying the line F. In the third phase, the slow running run detector pump 22 cannot maintain pressure above a predetermined reduced pressure because the restriction in the pressure regulating circuit 134 handles the output unassisted and without build-up of appreciable back pressure across the restriction.

The converse result from the foregoing can readily be visualized, namely, the three similar phases which occur when the vehicle is rolling forwardly under power and the control is reversed to a rear drive position. Circuit symmetry assures such result, the rolling vehicle in either event being immediately declutched and progressively braked, and subsequently being immediately unbraked and progressively clutched to drive in the opposite direction. That is to say, for declutching and braking simultaneously, an F directional pressure signal from the transmission signal pump 22 and an R directional pressure signal from the leftwardly tilted range selector valve 20b are produced which are opposite, and they are connected as input to the valve 102 which is in turn connected to the adjacent end of the valve spool CD.

It is significant in my invention that the transmission maintains disengagement only a minimum period during reversal of movement, which is valuable under the circumstances of rapid to-and-fro movement such as a crawler vehicle is utilized for. The spring tension in the recentering springs 138 and 122 is such that at a point prior to completion of the braking down of the vehicle, the compressed one of those springs 138 or 122 will overcome the diminishing pressure from the pump 22 and complete the power shift. Thus the selected driving clutch aids in reversing the vehicle direction by a somewhat premature engagement, either with or without assist from the brake cylinder 26 which, at some point, is disengaged completely. This invention in the broad sense contemplates a slight overlap between the selected clutch and the brake cylinder 26 in their operation, all prior to the point at which the vehicle transitorily reaches actual standstill.

It is appreciated from the preceding discussions under the neutralization headings that retention of the selector lever 72 in each of the three neutral positions or movement of the lever into but not past the neutral positions results in automatically holding the cylinder 26 in the brake-release position. Yet conventional manual controls remain available to set the brakes under those circumstances, as by pedal actuation or handle (H) actuation, with or without power assist such as from a brake booster cylinder (not shown) or the cylinders 50 or 26.

Variations within the spirit and scope of the invention described are equally comprehended by the foregoing description.

What is claimed is:

1. Process to reduce the change-direction-shock in a vehicle equipped with releasable brakes having a brakes-set condition to arrest movement of the vehicle in forward and rearward directions of actual movement, and further equipped with selectively operable torque transmission means having a selector to change the vehicle to a forward or rearward direction of movement desired and having a transmission-disconnect condition preceding each direction change, and signal comparison means (C,D) having only first and second points for receiving and comparing signals, said process comprising:
producing a vehicle direction signal comprising a forward vehicle signal when the vehicle is moving forwardly, or a rearward vehicle signal when the vehicle is moving rearwardly, and producing a vehicle control signal comprising a forward control signal when the transmission selector is in forward or a rearward control signal when the transmission selector is in reverse,
simultaneously applying one of said direction signals and an opposite one of said control signals to one of said points to disconnect the transmission and apply the brakes when the vehicle is moving in a direction opposite to the selected transmission drive direction, and
the vehicle just about stops preparatory moving in the same direction as the selected transmission direction.

* * * * *